United States Patent [19]

Gerhardt

[11] Patent Number: 5,398,888
[45] Date of Patent: Mar. 21, 1995

[54] SKEWED HINGE CONTROL SURFACE

[75] Inventor: Heinz A. Gerhardt, Redondo Beach, Calif.

[73] Assignee: Northrop Grumman Corporation, Los Angeles, Calif.

[21] Appl. No.: 60,899

[22] Filed: May 12, 1993

[51] Int. Cl.⁶ .......................... B64C 3/56; B64C 3/38; B64C 39/12; F42B 10/14
[52] U.S. Cl. .................. 244/45 A; 244/3.27; 244/3.28; 244/49
[58] Field of Search ............. 244/3.27, 3.24, 3.28, 244/3.29, 49, 46, 45 A, 75 R

[56] References Cited

U.S. PATENT DOCUMENTS

| | | | |
|---|---|---|---|
| 2,747,816 | 5/1956 | Howard . | |
| 2,924,400 | 2/1960 | Ruget . | |
| 2,997,260 | 8/1961 | Locke . | |
| 3,279,723 | 10/1966 | Wieland et al. . | |
| 3,642,234 | 2/1972 | Kamber et al. | 244/45 A |
| 3,730,458 | 5/1973 | Haberkorn | 244/43 |
| 3,883,094 | 5/1975 | Mederer | 244/45 |
| 4,161,300 | 7/1979 | Schwaerzler et al. | 244/45 |
| 4,247,062 | 1/1981 | Brueckner | 244/91 |
| 4,323,208 | 4/1982 | Ball | 244/3.28 |
| 4,354,646 | 10/1982 | Raymer | 244/87 |
| 4,381,091 | 4/1983 | Pegram | 244/87 |
| 4,466,586 | 8/1984 | Burnham | 244/75 |
| 4,542,866 | 9/1985 | Caldwell et al. | 244/45 |
| 4,667,899 | 5/1987 | Wedertz | 244/49 |
| 4,848,700 | 7/1989 | Lockheed | 244/45 |
| 4,896,846 | 1/1990 | Strom | 244/75 |
| 5,083,279 | 1/1992 | Burdoin | 244/45 A |
| 5,100,081 | 3/1992 | Thomas | 244/75 R |
| 5,192,037 | 3/1993 | Moorefield | 244/49 |
| 5,211,358 | 5/1993 | Bagley | 244/75 R |

Primary Examiner—Michael S. Huppert
Assistant Examiner—Virna Lissi Ansley
Attorney, Agent, or Firm—Terry J. Anderson; Karl J. Hoch, Jr.

[57] ABSTRACT

Aerodynamic control apparatus for an aircraft is provided which includes a pair of control surfaces, one for each side of the aircraft, each control surface extending between a root end at the fuselage and a distant tip end. The root end of each control surface is pivotally mounted on the fuselage on a stationary hinge axis which is angularly disposed relative to the longitudinal axis of the aircraft. The hinge axis is elevated or depressed at the leading edge of the control surface relative to the trailing edge such that the hinge axis is in an oblique orientation relative to the longitudinal axis of the aircraft. An actuator enables selective movement of each control surface to any one of a range of positions between an inactive position flush with a contoured outer surface of the fuselage and a deployed position at which a tip end of the control surface is distant from the fuselage. In one instance, the control surfaces can be simultaneously moved about their associated hinge axis on both sides of the fuselage to achieve pitch control of the aircraft. In other instances, only the control surface on one side is moved about its hinge axis to achieve either yaw control or roll control. In another embodiment, the control surfaces are mounted on hinge arms which offset the control surfaces from the fuselage to provide an air gap between control surface and fuselage.

11 Claims, 1 Drawing Sheet

U.S. Patent    Mar. 21, 1995    5,398,888
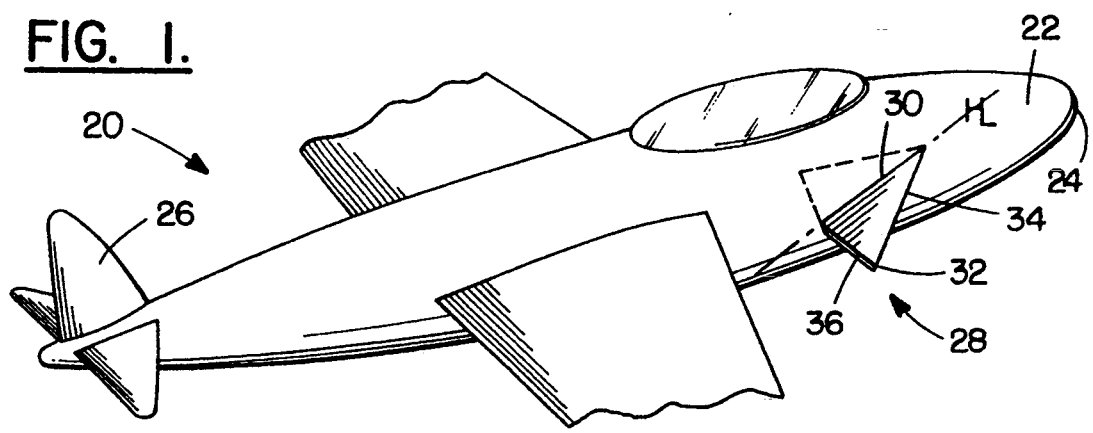
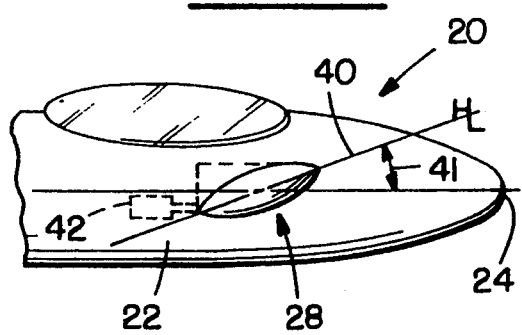 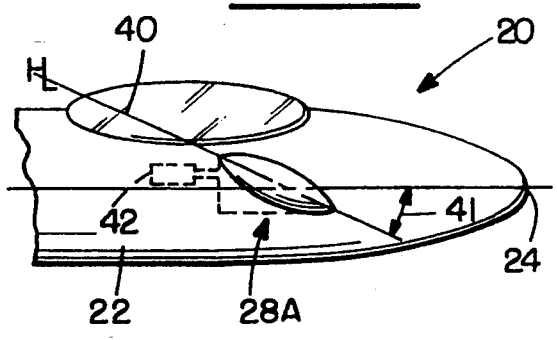
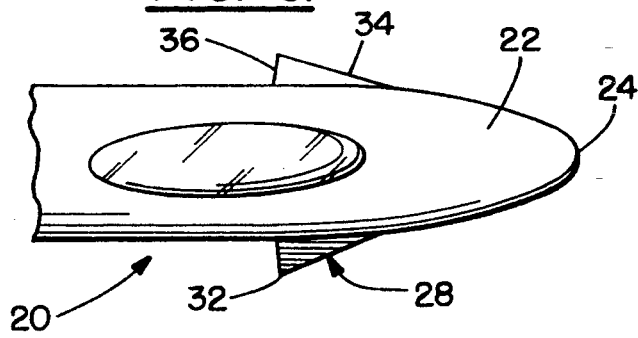 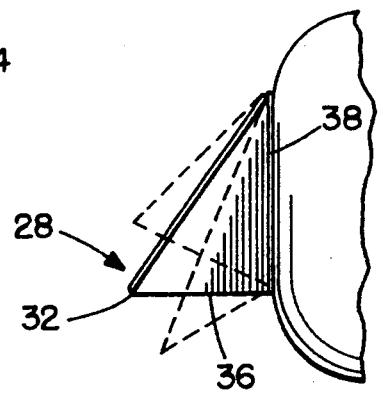
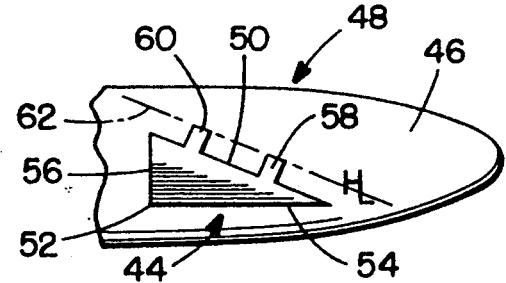 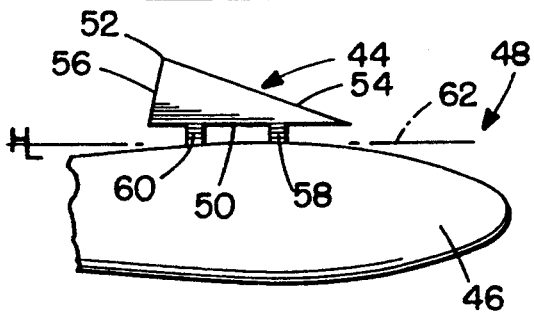

SKEWED HINGE CONTROL SURFACE

BACKGROUND OF THE INVENTION

1. Field of the Invention

The present invention relates to apparatus for aerodynamically controlling tile operation of a high performance aircraft. More specifically, the invention relates to the provision of an aircraft having aerodynamic control panels which (1) are retractable flush against the side of the fuselage for low drag and observables, (2) are deployable symmetrically, through a range of intermediate positions for longitudinal trim and control functions; (3) are deployable unilaterally through a range of intermediate positions for lateral/directional trim and control functions, primarily in roll and yaw; and (4) will open an air gap between the control panel and the outer surface of the fuselage upon deployment of the panel.

2. Discussion of the Prior Art

It has always been a goal of aircraft designers to improve the aerodynamic control and maneuvering capability of aircraft. Improving control and maneuvering is especially important for supersonic fighter aircraft. This is because they have special requirements related to their ability to "track" or "aim" their fuselage in a particular desired direction. Associated with this is a further requirement to change "tracking" or "aiming" direction quickly which is commonly called maneuverability.

Maneuvering flight means flight at high angles of attack. In that flight regime aircraft experience a severe degradation of aerodynamic control, and the large empennages typically associated with fighter aircraft are the usual design solutions to cope with these deficiencies. It is desirable to reduce the size of the empennage to achieve benefits in terms of weight, drag and signature. Therefore, it is an objective of this invention to allow an empennage size reduction by providing control surfaces, primarily on the forward fuselage, which (1) substitute the controllability lost by downsizing the empennage; (2) provide nearly constant controllability throughout the angle of attack range; (3) operate only intermittently in response to a required control command, but lie retracted into the fuselage contour in times of disuse in order to save drag.

The following U.S. patents disclose various known methods of employing canards and other external control surfaces: U.S. Pat. No. 2,747,816 to Howard; U.S. Pat. No. 2,997,260 to Locke, Jr.; U.S. Pat. No. 3,279,723 to Wieland et al.; U.S. Pat. No. 4,161,300 to Schwaerzler; U.S. Pat. Nos. 4,354,646 and 4,381,091 to Raymer; and U.S. Pat. No. 4,848,700 to Lockhead.

Particularly pertinent to the present invention are the U.S. Pat. No. 2,924,400 to Ruget; U.S. Pat. No. 3,730,458 to Haberkorn; U.S. Pat. No. 3,883,094 to Mederer; U.S. Pat. No. 4,247,062 to Brueckner; U.S. Pat. No. 4,542,866 to Caldwell et al.; and U.S. Pat. No. 4,896,846 to Strom.

In this regard, the patent to Ruget discloses movable control surfaces which lie generally in the plane of the longitudinal axis of the aircraft and are pivoted about their forwardmost extremities between a stowed position retracted into the fuselage and their extended or deployed positions. Haberkorn and Caldwell et al disclose opposed control or trim fins which can be pivoted about a longitudinal axis into and out of nesting pockets on opposite sides of the fuselage of the aircraft. When fully deployed, the trim fins can be pivoted about a laterally extended axis. Mederer discloses a foldable canard assembly that includes a pair of canards folded together as a single canard extending vertically downward from the fuselage. The canards unfold to a position extending laterally from the bottom of the fuselage, but are unable to fold into a retracted position flush with an outer surface of the fuselage. The patent to Brueckner discloses a delta-winged aircraft in which a wing tip and integral vertical tail can be pivoted about a longitudinal axis and also about a lateral axis to adjust the angle of attack thereof. The patent to Strom discloses non-retracting canard surfaces which are rotatable about a lateral axis. It was in light of the current technology as exemplified by the patents just described that the present invention was conceived and has now been reduced to practice.

SUMMARY OF THE INVENTION

The present invention, then, relates to an aerodynamic control apparatus for an aircraft. It is to be appreciated, however, that the control apparatus is equally applicable to any aerodynamic/hydrodynamic vehicle including airships, boats, vessels and submarines. The apparatus comprises a pair of control surfaces, one for each side of the aircraft, each control surface extending between a root end at the fuselage and a distant tip end. The root end of each control surface is pivotally mounted on the fuselage on a stationary hinge axis which is angularly disposed relative to the longitudinal axis of the aircraft. In one embodiment, the hinge axis is elevated at the leading edge of the control surface and depressed at the trailing edge with respect to the longitudinal axis of the aircraft. In another embodiment the hinge axis is lower at the leading edge relative to the trailing edge. An actuator enables selective movement of each control surface to any one of a range of positions between an inactive position flush with a contoured outer surface of the fuselage and a deployed position at which a tip end of the control surface is distant from the fuselage. In one instance, the control surfaces can be simultaneously deployed on both sides of the fuselage about their associated hinge axis to achieve pitch control of the aircraft. In another instance, only the control surface on one side of the fuselage is deployed to achieve either yaw control or roll control.

The control surfaces generate control forces from airloads acting on the deflected control surfaces themselves and from changes in airloads on adjacent fuselage surfaces induced by the deflected control surfaces. For control surfaces which are located on an aircraft forward fuselage, as envisioned, the airloads can be used to generate pitching, yawing and rolling control moments.

Each control surface comprises a fuselage panel and normally forms part of the fuselage surface. The control surfaces are deflectable into the airstream about a hingeline lying in the fuselage contour at an oblique angle relative to the local airflow. Deflection angles can range from zero to ninety degrees. The control surfaces normally lie flush in the fuselage's outer surface and are deployed only intermittently to generate a control impulse. A steady trim deflection would only be used under flight conditions where panel drag is of little consequence as when flying at high angles of attack.

A control surface of delta planform shape is illustrated in this disclosure as exemplary of the invention. However, the shape of the control surface is arbitrary and is not restricted to the delta planform shape. Control surface hinges are basically of two types. One type is characterized by a continuous mainly straight, piano-type hinge. In the other type, two or more hinge arms allow the control surface to be deployed farther away from the fuselage with a gap between control surface and fuselage to allow air to pass between panel and fuselage.

As the control surface is deployed into the airstream, forces act on it as a result of its incidence relative to the airflow. The deflected control surface also affects the body flowfield and thereby causes additional forces to act on the adjacent body surfaces. For certain aircraft configurations, the induced body forces may be detrimental. In such cases, an air gap between body and control surface as provided by the alternate hinge arrangement is used to minimize the body forces.

The panels may be positioned anywhere on the fuselage, although the preferred locations are on the forebody (forward fuselage). Left and right control panels are mirror images of each other with respect to an imaginary vertical plane passing through the aircraft centerline. Considering the cross section of the fuselage station where the panels are located, it is furthermore specified that the control surface positions may be anywhere on the section's periphery, although the preferred positions are at 10:30 and 1:30 o'clock on an imaginary clock face superimposed on the fuselage cross section.

The effectiveness of the control surfaces will change with fuselage incidence relative to the free stream as the fuselage flow field changes from attached flow to separated flow. In addition to the locally generated control forces, it is necessary to consider downstream effects of the wake of the control surfaces. Certain restrictions on control surface placement may be imposed for preventing the wake of the control surfaces to be ingested by the engine air inlets or from adversely interfering with the empennage.

A primary object, therefore, of the invention is to provide control surfaces which are retractable flush with the outer surface of the fuselage but can be rapidly deployed, when commanded.

Another object of the invention is to provide control surfaces which minimize drag and observability when not in use.

Still another object of the invention is to provide control surfaces which are selectively operable to provide pitch, yaw, and roll control, as desired.

Yet a further object of the invention is to provide control surfaces which are pivotally mounted on axes which are skewed relative to a longitudinal axis of the aircraft whereby their effectiveness is a function of the extent of their deflection about their hinge axis and thereby resulting in a significantly simplified design.

Yet another object of the invention is to provide such a control surface construction in which the control surfaces are deployed about offset hinges such that an air gap opens up between the panel and the fuselage to thereby minimize or eliminate flow interference between the control surfaces and the fuselage.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWING

FIG. 1 is a perspective view of a high performance aircraft which embodies the present invention;

FIG. 2A is a detail side elevation view of a portion of the aircraft illustrated in FIG. 1 depicting one orientation of a control surface according to the invention;

FIG. 2B is a detail side elevation view, similar to FIG. 2A, depicting another orientation of a control surface according to the invention; p FIG. 3 is a detail top plan view of the aircraft illustrated in FIGS. 1 and 2;

FIG. 4 is a detail front elevation view of the aircraft illustrated in FIGS. 1–3 and illustrating different positions of the skewed hinge control surface of the present invention;

FIG. 5 is a diagrammatic detail side elevation view of a portion of an aircraft modified with another embodiment of the invention; and FIG. 6 is a diagrammatic detail top plan view of the aircraft illustrated in FIG. 5.

DETAILED DESCRIPTION OF THE PREFERRED EMBODIMENTS

Turn now to the drawings, and initially, to FIGS. 1, 2A, 2B and 3 which generally depict an aircraft 20 which has been modified in accordance with the invention. Specifically, the aircraft 20 includes a fuselage 22 which extends between a nose 24 and a tail 26. In accordance with the invention, the aircraft 20 is provided with unique aerodynamic control apparatus in the form of a pair of control surfaces 28 mounted on opposite sides of the fuselage 22 and extending between a root end 30 and a tip end 32. Each control surface 28 is also defined as extending between a leading edge 34 generally facing in the direction of the nose 24 and a trailing edge 36 generally facing in the direction of the tail 26.

As seen in FIG. 4, a suitable hinge 38, which may be in the manner of a piano hinge, or in the manner of offset hinges such that individual, hinged units serve to mount the root end 30 of each control surface 28 for pivotal movement on the fuselage.

As seen in FIG. 1, and even more distinctly in FIGS. 2A and 2B, an axis 40 of the hinge 38 is angularly disposed relative to a longitudinal axis of the fuselage 22. The hinge axis 40 is either elevated at the leading edge 34 relative to the trailing edge 36 (see FIG. 2A) or, as indicated by a modified control surface 28A (see FIG. 2B), lower at the leading edge 34 relative to the trailing edge 36 when the longitudinal axis of the fuselage 22 lies in a level plane.

The fuselage 22 has a contoured outer surface as is customary for high performance supersonic aircraft. Also, each control surface 28 has a streamwise cross section typical of an aerodynamic control surface. The control surface 38 is moveable on the hinge axis 40 between an inactive position as indicated by dashed lines in FIGS. 1, 2A and 2B and a deployed position as indicated by solid lines. In the inactive position, the aerodynamic surface of the control surface is substantially flush with the contoured outer surface of the fuselage 22. In the deployed position, the tip end 32 is distant from the fuselage. It will be appreciated that the control surface 28 can assume any one of an infinite number of deflection angles between the inactive position and the deployed position. Three such positions are illustrated in FIG. 4, one being depicted by solid lines, one being depicted by dashed lines, and another being depicted by center lines.

A suitable actuator 42, as seen diagrammatically in FIGS. 2A and 2B, is provided to enable the pilot of the aircraft 20 to desirably deflect the control surfaces 28.

The control surfaces 28 may be installed at any location along the length of the fuselage 22. They need not be just at the forebody of the fuselage as depicted herein. Furthermore, the control surfaces may be installed at any position on the fuselage cross-sectional periphery; however, for equal control surface deflections, the surface on one side of the fuselage is always a mirror image of the surface on the other side of the fuselage with respect to an imaginary vertical plane passing through the aircraft fuselage. While the control surfaces 28 are provided in pairs, see especially FIG. 3, it is within the scope of the invention to provide more than one pair of the control surfaces at spaced locations along the length of the fuselage.

By actuating an control surface 28 on one side of the aircraft without actuating an associated control surface on the other side of the aircraft, yaw control is achieved. Actuating the control surfaces 28 on both sides of the fuselage equally and simultaneously provides pitch control of the aircraft. Combinations of these movements of the control surfaces 28 can be effectively used to provide more complex forms of control of the aircraft, as desired.

A somewhat modified embodiment of the invention is illustrated in FIGS. 5 and 6. In this embodiment, modified control surfaces 44, which may be similar in most respects to the control surfaces 28, are suitably mounted on the fuselage 46 of an aircraft 48. As with the control surfaces 28, each control surface 44 also extends between a root end 50 and tip end 52 and between a leading edge 54 and a trailing edge 56.

As diagrammatically depicted, hinge arms 58, 60 are attached to the root end 50 of the control surface 44 which offsets the hinge axis 62 away from the control surface 44 by the length of the hinge arms. Upon control surface deflection out of its inactive position in the fuselage contour an air gap opens up between fuselage and control surface. The air gap allows air to pass and thereby mitigate potential adverse interference effects between fuselage and control control surface. As in the instance of the prior embodiment, hinges pivotably support the control surface 44 for rotation about the skewed hinge axis 62. By reason of this skewed hinge axis, the leading edge 54 is elevated (or depressed) relative to the trailing edge 56 such that the hinge axis 62 is in an oblique orientation relative to the longitudinal axis of the fuselage 46 which lies in a substantially level plane.

While preferred embodiments of the invention have been disclosed in detail, it should be understood by those skilled in the art that various other modifications may be made to the illustrated embodiments without departing from the scope of the invention as described in the specification and defined in the appended claims.

I claim:

1. In combination with an aircraft including a fuselage having a nose, a tail, and a longitudinal axis extending between said nose and said tail, aerodynamic control apparatus comprising:

a control surface extending between a root end and a tip end distant from said root end and between a leading edge generally facing in the direction of said nose and a trailing edge generally facing in the direction of said tail; and means mounting said root end of said control surface on said fuselage for single degree of freedom pivotable movement on a stationary hinge axis which is angularly disposed relative to said longitudinal axis, said hinge axis extending in an oblique orientation relative to said longitudinal axis, said hinge axis and said longitudinal axis being axially divergent each from the other.

2. The combination with an aircraft of aerodynamic control apparatus as set forth in claim 1:

wherein said fuselage has a contoured outer surface; and wherein said control surface has an aerodynamic surface extending between said leading edge and said trailing edge;

said control surface being movable on said hinge axis between an inactive position whereat said aerodynamic surface of said control surface is substantially flush with said contoured outer surface of said fuselage and a deployed position wherein said tip end is distant from said fuselage.

3. The combination with an aircraft of aerodynamic control apparatus as set forth in claim 2 including:

actuator means for moving said control surface on said hinge axis to an intermediate position of a range of positions between said inactive position and said deployed position.

4. In combination with an aircraft including a fuselage having a nose, a tail, a contoured outer surface, and a longitudinal axis extending between said nose and said tail, aerodynamic control apparatus comprising:

a control surface extending between a root end and a tip end distant from said root end and between a leading edge generally facing in the direction of said nose and a trailing edge generally facing in the direction of said tail;

at least two hinge arms extending from said root end at spaced locations transversely of said root end to respective hinge ends proximate said contoured outer surface; and hinge means connecting each of said hinge ends to said fuselage at spaced apart locations between said leading edge and said trailing edge for single degree of freedom pivotable movement on a stationary hinge axis which is angularly disposed relative to said longitudinal axis, said hinge axis extending in an oblique orientation relative to said longitudinal axis, said hinge axis and said longitudinal axis being axially divergent each from the other.

5. The combination with an aircraft of aerodynamic control apparatus as set forth in claim 4, wherein each of said hinge arms is pivotably moveable on said hinge axis between a retracted position wherein said root end is proximate said contoured outer surface of said fuselage and an extended position wherein said root end is spaced from said contoured outer surface.

6. The combination with an aircraft of aerodynamic control apparatus as set forth in claim 5, wherein said control surface has an aerodynamic surface extending between said leading edge and said trailing edge;

said control surface and said hinge arms being movable on said hinge axis between an inactive position wherein said aerodynamic surface of said control surface is substantially flush with said contoured outer surface when said hinge arms are in their respective said retracted positions and a deployed position wherein said tip end is distant from said fuselage when said hinge arms are in their respective said extended position.

7. The combination with an aircraft of aerodynamic control apparatus as set forth in claim 6 including:
actuator means for moving said control surface to an intermediate position of a range of positions between said inactive position and said deployed position.

8. The combination with an aircraft of aerodynamic control apparatus as set forth in claim 5 including:
drive means on said fuselage for moving said hinge arms between said retracted position and said extended position.

9. In combination with an aircraft including a fuselage having a nose, a tail, first and second opposed contoured outer surfaces, and a longitudinal axis extending between said nose and said tail, aerodynamic control apparatus comprising:
a first control surface extending between a first root end proximate said first outer surface and a first tip end distant from said first root end and between a first leading edge generally facing in the direction of said nose and a first trailing edge generally facing in the direction of said tail;
a second control surface extending between a second root end at said second outer surface and a second tip end distant from said second root end and between a second leading edge generally facing in the direction of said nose and a second trailing edge generally facing in the direction of said tail; and
means mounting said respective root end of each of said first and second control surfaces on said fuselage for single degree of freedom pivotable movement on a stationary hinge axis which is angularly disposed relative to said longitudinal axis, said hinge axis extending in an oblique orientation relative to said longitudinal axis, said hinge axis and said longitudinal axis being axially divergent each from the other.

10. The combination with an aircraft of aerodynamic control apparatus as set forth in claim 9:
wherein each of said first and second control surfaces has an aerodynamic surface extending between said leading edge and said trailing edge;
said first and second control surfaces being movable on its associated one of said hinge axis between an inactive position whereat said aerodynamic surface of said control surface is substantially flush with said contoured outer surface of said fuselage and a deployed position whereat said tip end is distant from said fuselage.

11. The combination with an aircraft of aerodynamic control apparatus as set forth in claim 10, further comprising:
actuator means for independently moving each of said first and second control surfaces on its associated hinge axis to an intermediate position of a range of positions between said inactive position and said deployed position of said each of said first and second control surfaces;
said actuator means being selectively operable for moving a selected one of said first and second control surfaces about its associated said hinge axis without movement of said other of said first and second control surfaces about its associated said hinge axis;
said actuator means being selectively operable for symmetrically moving said first and second control surfaces equally and simultaneously in opposite directions about their respective associated said hinge axis;
said actuator means being selectively operable for asymmetrically moving said first control surface about its associated said hinge axis in a first direction through a first deflection angle to a first intermediate position of a first range of positions between its said associated inactive position and its said associated deployed position, said actuator means being selectively operable for asymmetrically moving said second control surface about its associated said hinge axis in a second direction opposite to said first direction through a second deflection angle differing from said first deflection angle to a second intermediate position of a second range of positions between its said associated inactive position and its said associated deployed position.

* * * * *